(12) United States Patent
Maezawa

(10) Patent No.: US 7,360,045 B2
(45) Date of Patent: Apr. 15, 2008

(54) SYSTEM AND METHOD FOR BACKING UP DATA FROM A QUIESCED STORAGE DEVICE

(75) Inventor: Yasunori Maezawa, Sagamihara (JP)

(73) Assignee: Lenovo Singapore Pte. Ltd., Singapore (SG)

( * ) Notice: Subject to any disclaimer, the term of this patent is extended or adjusted under 35 U.S.C. 154(b) by 504 days.

(21) Appl. No.: 10/249,333

(22) Filed: Apr. 1, 2003

(65) Prior Publication Data

US 2003/0188115 A1 Oct. 2, 2003

(30) Foreign Application Priority Data

Apr. 1, 2002 (JP) ............................. 2002-098826

(51) Int. Cl.
*G06F 12/16* (2006.01)
*G06F 1/00* (2006.01)

(52) U.S. Cl. ...................................... 711/162; 713/340
(58) Field of Classification Search ...................... None
See application file for complete search history.

(56) References Cited

U.S. PATENT DOCUMENTS

| | | |
|---|---|---|
| 5,551,043 A | 8/1996 | Crump et al. |
| 5,560,023 A | 9/1996 | Crump et al. |
| 5,715,464 A | 2/1998 | Crump et al. |
| 5,752,044 A | 5/1998 | Crump et al. |
| 5,758,174 A | 5/1998 | Crump et al. |
| 5,924,102 A * | 7/1999 | Perks .......................... 707/200 |
| 6,052,793 A * | 4/2000 | Mermelstein ................ 713/340 |
| 6,385,721 B1 * | 5/2002 | Puckette ......................... 713/2 |
| 6,901,493 B1 * | 5/2005 | Maffezzoni .................. 711/162 |

OTHER PUBLICATIONS

"IBM LANClient Control Manager Version 2.5—Unattended, Remote Configuration of IBM Clients," Software Announcement, Dec. 15, 1998, 298-467 (2 sheets).
"IBM System Installation Tool Kit—Industry Leading Tools to Deploy PCs," Software Announcement, Apr. 18, 2000, 200-092 (4 sheets).

* cited by examiner

*Primary Examiner*—Hyung S. Sough
*Assistant Examiner*—Duc T. Doan
(74) *Attorney, Agent, or Firm*—Kunzler & McKenzie; Carlos Munoz-Bustamante

(57) ABSTRACT

Provided is a Method and Computer Apparatus being capable of safely and reliably making a backup copy of data stored on the Hard Disk Drive (HDD). A user places a PC in a hibernation state by inputting a particular key operation under a typical OS environment. The working state data is stored on the HDD just before the backup copy of data is created. During the process of backup, an OS in a hidden partition of the HDD is booted so as to execute a program for making a dead copy of the HDD. When the dead copy processing by the copy program from the HDD to the backup HDD is completed, the PC system's operation is resumed and an OS is booted so as to recover from the hibernation state to the original state.

22 Claims, 6 Drawing Sheets

Dead Copy Request(DCR)
0 : Not Requested
1 : Requested

Dead Copy Complete(DCC)
0 : Not Complete
1 : Complete

RTC HDD2HDD Request(RHR)
0 : Not Requested
1 : Requested

Sleep State to Wake(SSW)
0 : Not Saved
1 : S3(Suspend)
2 : S4(Hibernation)

*FIG. 2*

SYSTEM AND METHOD FOR BACKING UP DATA FROM A QUIESCED STORAGE DEVICE

BACKGROUND OF THE INVENTION

The present invention relates to copying data in a computer apparatus.

In recent years, HDDs (hard disk drives) used as a storage device in computer apparatus such as personal computers (hereinafter referred to as PCs as occasion demands) have increased in storage capacity.

Users may replace HDDs of their own PCs with such HDDs of larger capacities. In such a case, there is a need to transfer a large amount of data stored in an HDD to be replaced to an HDD having a larger capacity.

Backup of data stored in an HDD is performed comparatively frequently for preparation against occurrence of a fault in the HDD of a PC as well as for transfer of data in the case of replacement of the HDD. In particular, the importance of backup becomes higher with the increase in capacity of HDDs since the loss caused by a fault in an HDD is large if the capacity of the HDD is large. In the case of portable PCs such as notebook PCs, the frequency of occurrence of faults caused by falls is higher than that in the case of desktop PCs. Therefore the importance of backing up data is also very high with respect to such portable PCs.

Conventionally, it is possible to use a backup function provided in an OS (operating system) in the case of transfer of data from an HDD to another HDD or backup of data in an HDD.

This backup function is performed in such a manner that a device is connected to a PC and this device backs up data in a HDD by saving the data to a storage medium such as a tape or a CD-R (CD-recordable).

The backup function provided in the above-mentioned OS requires a high degree of skill by the users, and there is a problem that a user cannot easily and safely back up data in an HDD or transfer the data to another HDD.

Also, a device other than a PC is required for backup. This is also a major reason for the problem that backup is not easy for everyone to perform.

Among recent notebook PCs, a type of notebook PC has appeared which has a portion called a bay or a docking station to which some of various drive units including a CD-ROM or an HDD can be detachably attached. It is conceivable that a backup HDD is attached to such a bay to back up data in a main HDD incorporated in a PC.

However, while backup of data from the main HDD to the backup HDD is being performed, a change is made every moment in the contents of the HDD in a PC in use, i.e., the main HDD, as a change in a file or the like through a LAN for external data communication, an input/output (I/O) device which receives an operating input or the like from a mouse or a keyboard operated by a user or from a CD or a DVD for data read/write, processing in the OS, etc. For this reason, data in the HDD is not fixed (isolated) and the consistency of data cannot be ensured from the point in time at which backup is started to the point in time at which backup is finished. There is, therefore, a possibility of data copied onto the backup HDD becoming unusable as a result of destruction of the file system or the like.

This is because in current PCs during execution of one OS, the PC cannot be changed to execute another OS unless the operation of the first OS is temporarily stopped by a restart of the PC or the like.

Even if backup can be reliably performed, there is also a problem that, for example, in a case where a fault occurs in an HDD of a PC and where data in the HDD is restored by using a backup of the data, reinstallation of the OS in the HDD of the PC, reinstallation of various device drivers, copying of the backup data, etc., are necessary, certain skills are required for them, and such operations are considerably troublesome and time-consuming.

Some of recent PCs have a so-called recovery function, i.e., the function of instantly restoring data in an HDD to the state at the time of shipment of the PC from a maker (hereinafter referred to as "initial state") when a fault or the like occurs.

Such a recovery function can be realized in such a manner that a predetermined key is operated during POST (Power on Self Test) automatically executed at the time of startup of a PC to make a recovery program run without starting an ordinary OS (Windows(Trademark of the Microsoft Corporation (Redmond, Wash.), for example).

By this operation, however, data in the HDD is replaced with that in the initial state of the HDD at the time of shipment from a factory and all of applications, data, etc., installed by a user after purchase of the PC are thereby lost.

The present invention has been achieved by considering technical problems such as those described above, and a main purpose of the present invention is to provide a technique for enabling a dead copy of data to be made safely and reliably. As here used, the phrase "dead copy" refers to a copy which is fixed and unchanging, as distinguished from a "live copy" in which changes are ongoing.

Another purpose of the present invention is to provide a technique for enabling an OS in operation to be changed to another OS.

BRIEF SUMMARY OF THE INVENTION

According to the present invention, a computer apparatus is provided to achieve the above-described purposes has system storage means such as an HDD or a non-volatile memory in which a first basic system and a second basic system for operating the computer apparatus is stored, and non-volatile data storage means such as an HDD in which data used when the computer apparatus operates in an environment under the first basic system is stored. When a predetermined trigger is input while the computer apparatus is operating in the environment under the first basic system, data stored in the data storage means is fixed by data fixing means. After the completion of fixation, the environment in which the computer apparatus operates is changed from the first basic system to the second basic system by system switching means. Further, in an environment under the second basic system, data stored in the data storage means is dispatched to an external place by data dispatching means.

The data fixing means can fix, on the basis of input of the trigger, the data stored in the data storage means by storing the worked data at the point in time corresponding to the input of the trigger. For example, it is possible to achieve such fixation of data by setting the computer apparatus in a state immediately before a stage at which a transition to a hibernation state can be made in the computer apparatus. The hibernation state is based on a function supported by an Os or a BIOS (binary input/output system). When a transition to the hibernation state is made, the state of setting of hardware immediately before the transition and the contents of a main memory are written as a file to the HDD, thereby enabling the same state as that immediately before the transition to the hibernation state to be restored on the basis of information stored in the HDD even when the PC is restarted after the power supply for the PC has been cut off. Ordinarily, the hibernation state may include shutting off power supply except for power supply to a portion of the PC after saving information on the state immediately before transition to the hibernation state to the HDD. In the present invention, however, shutting off of the power supply is not necessarily required. Saving information on the state immediately before a transition to the hibernation state to the HDD and making the state immediately before the stage at which a transition to the hibernation state can be made may suffice.

In this state, a dead copy of the data in the data storage means can be made by dispatching all the data in the data storage means to an external place. The external place may be, as described hereinafter, a separate data storage device, connected with the computer system in some appropriate manner. The external place may also be a separate device normally housed within the computer system or even a separate partition within a massive non-volatile storage device such as a large hard disk drive.

The data dispatching means can dispatch data to a storage device detachably connected to the computer apparatus. The data dispatching means can also dispatch data to an external data storage device via a network. At this time, the data can be dispatched after being processed so as to be formed as a compressed image.

As the trigger for the above-described dead copying processing, a signal output by time management means at a time set in advance may be used as well as a signal input by a predetermined key operation or the like performed by a user.

The predetermined trigger is input to enable the computer apparatus to execute a sequence of operations for fixing data, changing the basic system, and dispatching data.

In a method of making a dead copy of data in accordance with the present invention, when a predetermined trigger signal is input to a computer apparatus, data in a data storage part is fixed and dead copying of the fixed data in the data storage part to another data storage device is performed.

Preferably, in the step of fixing the data in this method, a state for stopping the operation of the basic system of the computer apparatus is made. Also, preferably, a state in which data in working can be stored in the data storage part and in which the supply of power to the data storage part can be shut off is made to release all resources (hardware resources, etc.) in the computer apparatus. In this case, in the step of making a dead copy of data, another basic system is made to operate and a dead copy of the data in the data storage part is made to another data storage device by using some of the released resources in an environment under another basic systems.

After the completion of dead copying to another data storage device, the operation of the basic system of the computer apparatus is restarted.

The present invention may also be viewed as a program for making a computer apparatus execute working state storage processing for storing in a hard disk drive the operating state of the computer apparatus at a point in time when an input of a predetermined trigger is received, operation stopping processing for stopping the operation of a basic system of the computer apparatus, data dispatching processing for reading out all data stored in the hard disk drive and dispatching the data to an external data storage device, and operation restarting processing for restarting the operation of the basic system after dispatching of the data.

In this program, when a predetermined input is made at the time of booting of the computer apparatus, processing for restoring the hard disk drive to an initial state may be executed.

The present invention may also be viewed as a computer apparatus having a data storage part having a first area in which a first basic system is stored, and a second area in which a second basic system is stored, and a program storage part in which is stored a program for making an MPU execute processing for stopping the operation of the first basic system on the basis of the trigger, for storing in the data storage part a working state in an environment under the first basic system, and for thereafter starting the second basic system stored in the second area of the data storage part. In order to store the working state in an environment under the first basic system in the data storage part, it is possible to make a transition to the hibernation state in the computer.

In this computer apparatus, transition from an environment under the first basic system to an environment under the second basic system can be made without manually performing a restarting operation or the like.

Further, predetermined processing may be executed by an application operating on the second basic system after startup of the second basic system. This application can execute, as the predetermined processing, processing for dispatching data in the data storage part to an external place. In this case, the data to be dispatched may be processed as desired.

Also, the program may be such that, after the completion of the predetermined processing, the operation of the second basic system is stopped, the operation of the first basic system is restarted, and the working state before stopping of the first basic system is restored on the basis of the working state stored in the data storage part.

While the arrangement is adopted in which the computer apparatus operates by two kinds of basic systems: the first basic system and the second basic system, the present invention can also be applied to an arrangement in which a computer apparatus can operate by selectively using three or more basic systems. In such a case, a basic system in operation may be viewed as the first basic system, and another basic system to be thereafter selected by switching may be viewed as the second basic system.

In a method for operating a computer apparatus in accordance with the present invention, the computer apparatus is made to execute, when a predetermined trigger is input to the computer apparatus operating in an environment under a first basic system, the steps of storing in a data storage part a working state in the environment under the first basic system, stopping the operation of the first basic system, and starting a second basic system.

The present invention may also be viewed as a program for making a computer apparatus execute, when a predetermined trigger is input to the computer apparatus operating in an environment under a first basic system, the following processings: processing for stopping the operation of the first basic system, processing for storing in a data storage part a working state in the environment under the first basic system, processing for starting a second basic system, and starting an application operating on the second basic system.

In this program, the computer apparatus may be further made to execute processing for starting the second basic system and starting another application operating on the second basic system when another predetermined trigger is input at the time of booting of the computer apparatus.

The above summary of the invention does not enumerate all of the necessary features for the present invention, but some combinations of these features may be also inventive features.

BRIEF DESCRIPTION OF THE SEVERAL VIEWS OF THE DRAWINGS

Some of the purposes of the invention having been stated, others will appear as the description proceeds, when taken in connection with the accompanying drawings, in which:

FIG. 2 is a diagram showing an example of flags set in a CMOS;

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

The present invention will be described in detail with respect to an embodiment thereof with reference to the accompanying drawings.

Figure 1:
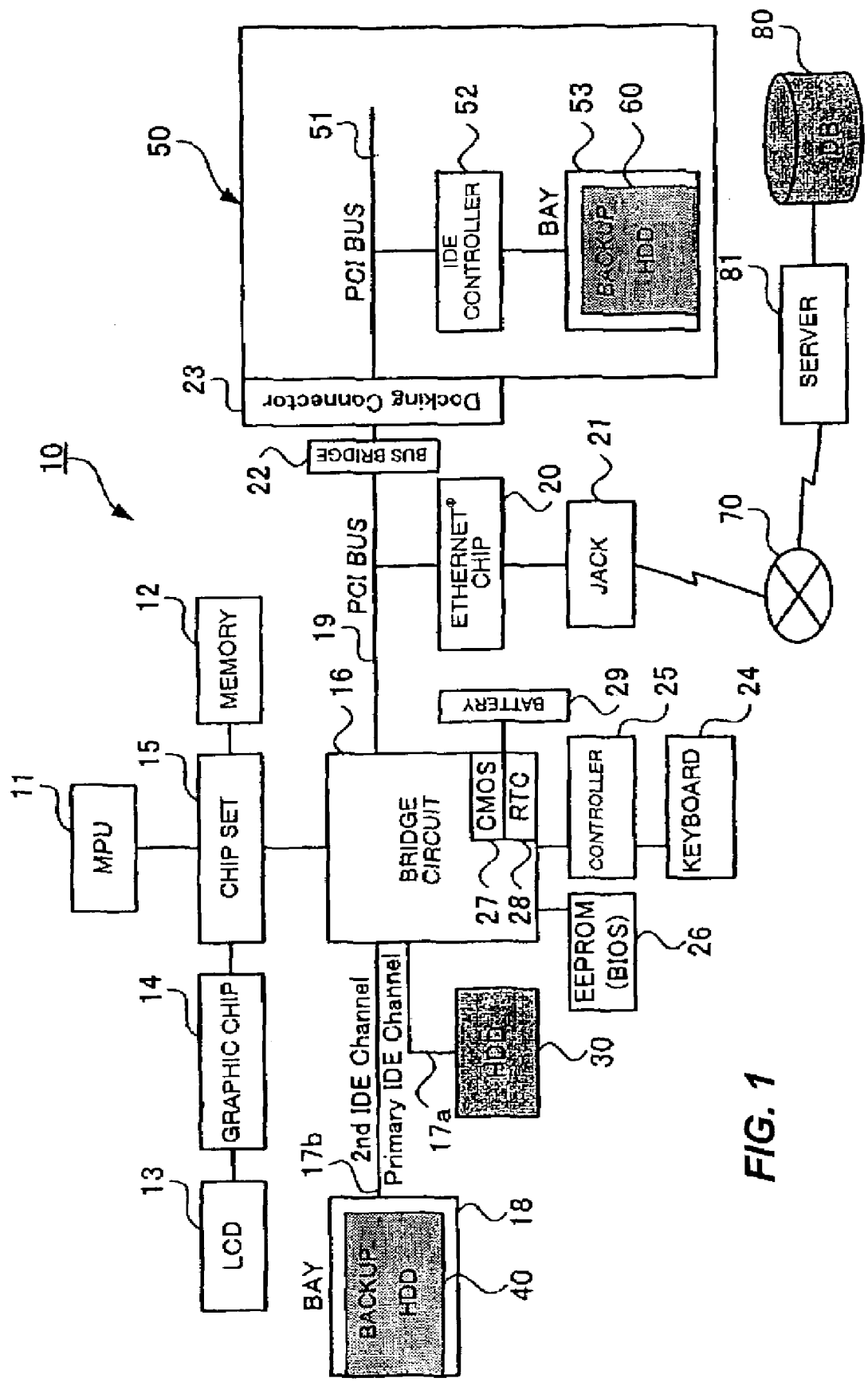
FIG. 1 is a diagram showing the basic configuration of a computer apparatus in an embodiment of the present invention.

Referring now more particularly to the accompanying drawings, FIG. 1 is a diagram for explaining the device configuration of a PC in this embodiment. As shown in FIG. 1, a PC (computer apparatus) 10 has an MPU (microprocessor unit) 11 which executes processing based on a predetermined control program, a memory 12 such as a RAM (random access memory) in which processing data is stored, a graphic chip 14 which controls images displayed on a display unit (LCD) 13, and a chip set 15 to which the MPU 11, the memory 12 and the graphic chip 14 are connected.

The chip set 15 is connected to a bridge circuit 16.

The bridge circuit 16 has an IDE control function. An HDD (system storage means, data storage means, data storage port, data storage part, or system storage part) 30 incorporated in the PC 10 is connected to the bridge circuit 16 through a primary IDE channel 17a. A connector provided in a bay 18 to which bay devices such as various IDE devices and an FDD can be attached is connected to the bridge circuit 16 through a secondary IDE channel 17b. The bay 18 is, for example, an accommodation place provided in the notebook type of PC 10. A bay device is accommodated in the bay 18 in a detachably attached state (inserted in a state of being capable of being drawn out). Bay device which can be attached to the bay 18 is formed as a unit having a predetermined external shape conforming to the bay 18. In the PC 10 of this embodiment, an HDD 40 for backup (storage device or another data storage device, hereinafter referred to as "backup HDD") can be attached as a kind of bay device to the bay 18. The bridge circuit 16 controls input/out of data to or from the HDD 30 or the backup HDD 40 attached to the bay 18.

An Ethernet chip (data dispatching means) 20 is connected to the bridge circuit 16 through a PCI (Peripheral Component Interconnect) bus 19. The Ethernet chip 20 is connected to an external network 70 such as the Internet or a LAN (local area through a jack 21 and performs communication control on the network 70. The Ethernet chip 20 has a function called PXE (Pre-boot Extension Environment) realized by a firmware for operating the Ethernet chip 20. By services called RIS (Remote Installation Services) provided by this function, the Ethernet chip 20 can receive an image of data in the HDD 30 stored in a database 80 in an external server 81 described below and load the data image in the HDD 30.

The bridge circuit 16 is provided with a docking connector 23 connected through a bus bridge 22 provided on the PCI bus 19. An external device connector called a docking station 50 can be attached to the docking connector 23.

The docking station 50 is constructed separately from the PC 10 so as to be detachably attached to, for example, a bottom surface of the PC 10. The docking station 50 has a PCI bus 51 connected to the docking connector 23. An IDE controller 52 is provided on the PCI bus 51. A connector provided on a docking bay 53 is connected to the IDE controller 52. To this connector, bay devices such as various IDE devices and an FDD can be connected like those connected to the bay 18.

Bay device which can be attached to the docking bay 53 is formed as a unit having a predetermined external shape conforming to the docking bay 53. In this embodiment, an HDD 60 for backup (storage device or another data storage device, hereinafter referred to as "backup HDD") can be attached as a kind of bay device to the docking bay 53. The IDE controller 52 controls input/out of data to or from the backup HDD 60 attached to the docking bay 53.

To the bridge circuit 16 are further connected a controller 25 which outputs an event on the basis of an input of a signal from a keyboard 24 or an unillustrated pointing device such as a mouse, and an EEPROM (electrically erasable and programmable ROM) 26 in which a BIOS (basis input/output system) is stored. The BIOS controls the HDD 30, the backup HDD 40, the EthernetÂ□ chip 20, the IDE controller 52, etc., according to an input from the keyboard 24 or the pointing device.

The controller 25 also functions as an embedded controller (EC) for controlling power supplied to each section of the PC 10.

Also, the bridge circuit 16 incorporates a CMOS (complementary metal oxide semiconductor) 27 in which various sorts of setting information are stored, and an RTC (time management means) 28 which performs real time clock control. Power is constantly supplied to the CMOS 27 and the RTC 28 by a battery 29.

As shown in FIG. 2, the CMOS 27 stores at least information as to whether a dead copy request (DCR) has been made, information (DCC) as to whether dead copying has been completed, information (RHR) as to whether a request for dead copying to be executed at a predetermined time by the RTC 28 described below has been made, and information (SSW) as to whether the state of the power supply for the PC 10 is a suspended state (generally referred to as "S3"), a hibernation state (generally referred to as "S4"), or a state other than the suspended and hibernation states (Not Saved).

Figure 3:
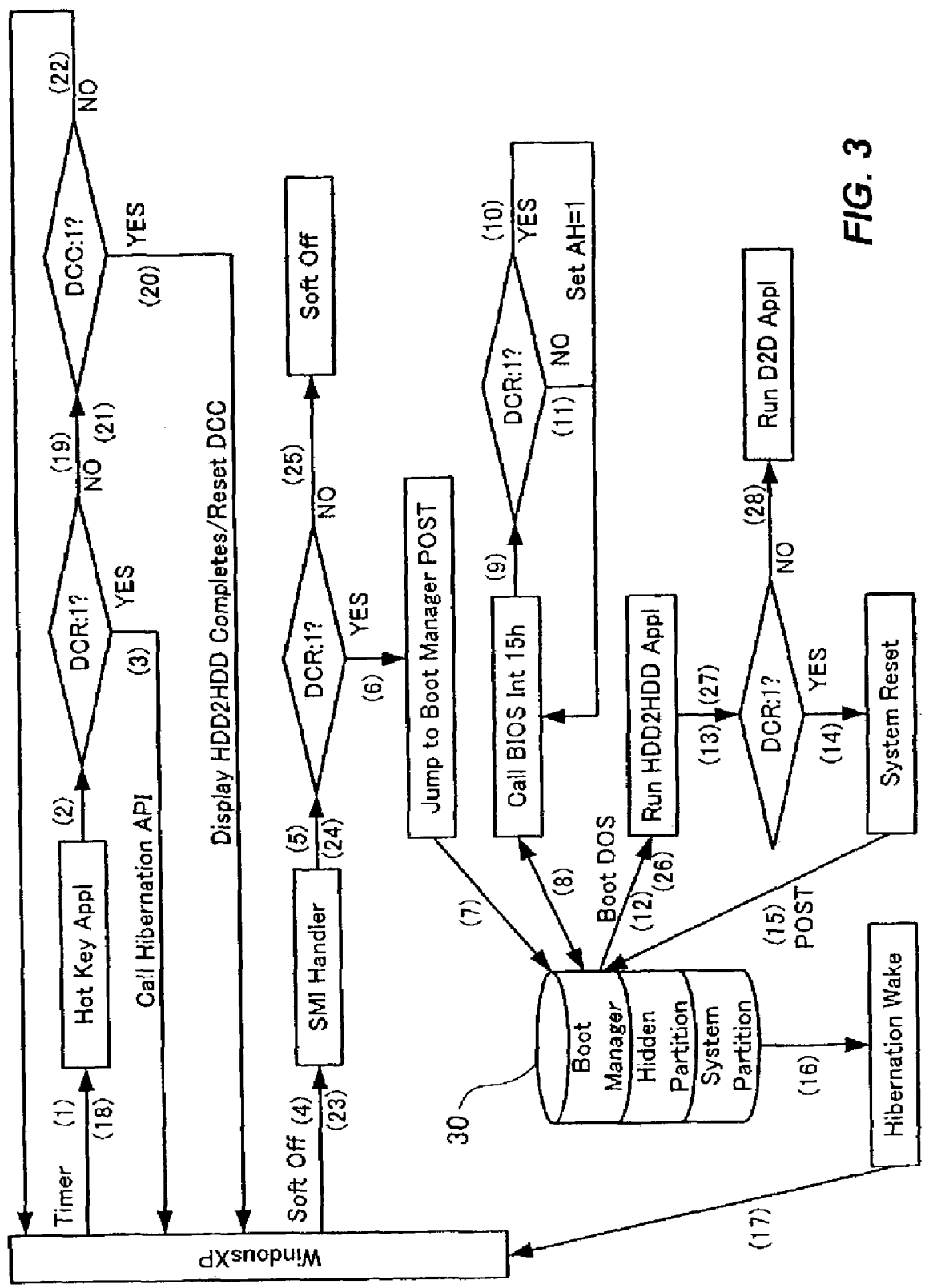
FIG. 3 is a diagram for explaining the flow of processing for making a dead copy of an HDD.

The HDD 30 is, of course, a non-volatile storage device, and the data storage area in the HDD 30 is divided into, as shown in FIG. 3, an area (boot manager) where a boot manager program for selecting a system to operate at the time of startup of the PC 10 is stored, a system partition (first area) which is an area under the control of an OS such as Windows provided as a first basic system to be used during ordinary operation of the PC 10, and a hidden partition (second area) which is an area under the control of an OS such as DOS or Linux provided as a second basic system, and in which programs for performing dead copying of the HDD 30 and executing for restoring the HDD 30 to the state at the time of shipment are stored, the first and second areas being separated by partitioning.

Ordinarily, a user can use, among these areas, only the area under the control of the OS which is Windows or the like. The boot manager program and the programs for performing dead copying of the HDD 30 and executing processing for restoring the HDD 30 to the state at the time of shipment are stored in the hidden partition (storage in the hidden partition is not necessary required).

The PC 10 of this embodiment can make a backup copy (hereinafter referred to as "dead copy" as occasion demands) of data in the incorporated HDD 30 by saving it to one of the backup HDD 40 attached to the bay 18, the backup HDD 60 attached to the docking bay 53, and the database (external data storage device or another data storage device) 80 provided in the external server 81 accessible via the network 70.

A method of making a dead copy of data in the HDD 30 will be described below.

Execution by User Operation

It is assumed here that a user selects, for example, the backup HDD 40 attached to the bay 18 as a destination for a dead copy of data in the HDD 30.

It is also assumed that the user uses the PC 10 in the power-on state in an environment under an ordinary OS (Windows or the like) when the backup HDD 40 is attached to the bay 18.

Figure 4:
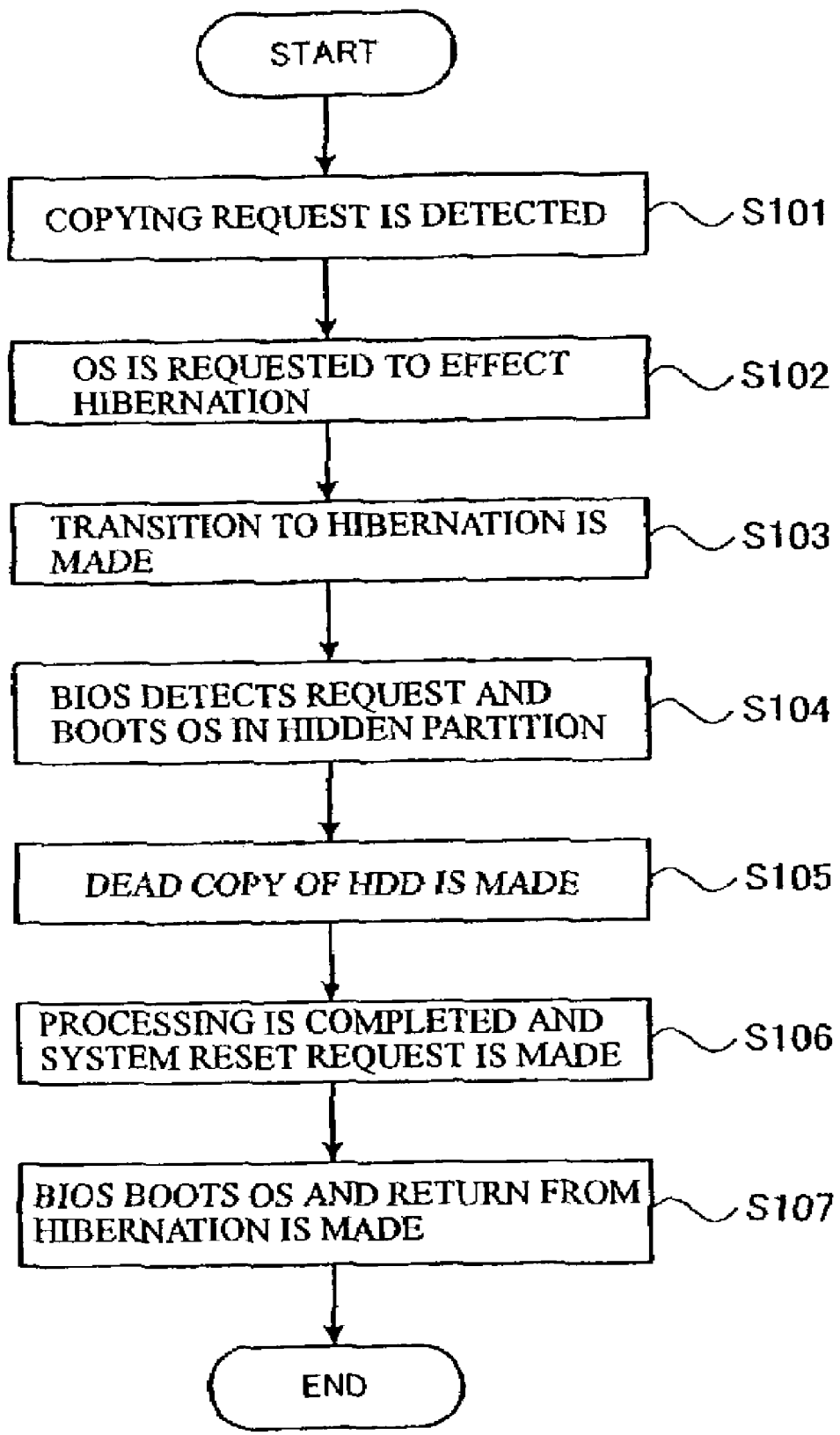
FIG. 4 is a diagram for outlining processing for making a dead copy of an HDD.

In this situation, the user makes a request for dead copying of data in the HDD 30 as shown in FIG. 4. When this request is detected as a trigger on the PC 10 side (step S101), the OS is requested to make a transition to a hibernation state (step S102). In response to this request, the OS sets the power supply for the PC 10 in a hibernation state (step S103). In the PC 10, data in working immediately before the transition is thereby stored in the HDD 30 and the supply of power to the sections other than predetermined sections is shut off.

When the BIOS of the PC 10 detects the dead copying request, it boots the OS in the hidden partition in the HDD 30 and then executes a program for performing dead copying of the HDD 30 (hereinafter referred to as "copying program") (steps S104 and S105).

When processing for dead copying to the HDD 40 for backing up the HDD 30 is completed by the copying program, the OS in the hidden partition makes a request for reset of the system of the PC 10 (step S106). Then, the PC 10 resumes operation, boots the ordinary OS (Windows or the like) and restores from the hibernation state to the original state (step S107).

Referring back to FIG. 3, there is a diagram for a further detailed description of the above-described sequence of processing steps.

When the user performs a predetermined operation for starting processing for making a dead copy of data in the HDD 30, e.g., an operation using a function or particular key, the controller 25 detects this operation and notifies the BIOS stored in the EEPROM 26 of this event. The BIOS then sets in the CMOS 27 a flag (DCR: 1 (Requested)) indicating that the dead copying request has been made.

On the other hand, a resident agent called a hot key applet periodically monitors information in the CMOS 27 on the basis of the timer ((1) in FIG. 3) to check whether the flag (DCR: 1 (Requested)) indicating that a dead copying request has been made is set in the CMOS 27 ((2) in FIG. 3). If the resident agent determines that the flag (DCR: 1 (Requested)) indicating that a dead copying request has been made is set, it requests the OS through an API (application program interface) to make a transition to the hibernation state ((3) in FIG. 3).

The OS receiving this request makes a transition to the hibernation state in the PC 10. The hibernation state is a state in which power is supplied only to the bridge circuit 16, the EthernetÂ□ chip 20, the controller 25, etc., while the supply of power to the other sections including the MPU 11, the memory 12, the chip set 15 and the HDD 30 is stopped. In the PC 10, at the time of transition to the hibernation state, data in the worked state immediately before the transition is stored in the HDD 30 and the operation of shutting off the power supply is thereafter enabled. The data in the HDD 30 is thereby fixed. That is, the OS which controls transition to the hibernation state functions as a data fixing means of the HDD 30. The ordinary OS suspends by transition to the hibernation state. Ordinarily, the hibernation state may include shutting off power supply except for power supply to a portion of the PC 10 after saving information on the state immediately before transition to the hibernation state to the HDD. With respect to this embodiment, however, saving information on the state immediately before transition to the hibernation state to the HDD 30 to make an immediately preceding condition enabling shutting off of power supply is referred to as transition to the hibernation state.

After the transition to the hibernation state in the PC 10 has been completed, the OS makes a request for soft off (Soft Off) ((4) in FIG. 3).

Then, the chip set 15 hands over processing to the BIOS by a SMI interrupt function. The SMI handler in the BIOS is then started to check whether the flag (DCR: 1 (Requested)) indicating that a dead copying request has been made is set in the CMOS 27 ((5) in FIG. 3). If it is thereby determined that the flag (DCR: 1 (Requested)) indicating that a dead copying request has been made is set, a jump is made to the POST in the BIOS to start the boot manager program stored in the HDD 30 ((6) and (7) in FIG. 3).

The boot manager program which is a system switching means is then started by the POST and the boot manager program calls the BIOS ((8) in FIG. 3). The BIOS checks whether the flag (DCR: 1 (Requested)) indicating that a dead copying request has been made is set in the CMOS 27 ((9) in FIG. 3). If it is thereby determined that the flag (DCR: 1 (Requested)) indicating that a dead copying request has been made is set, a flag (AH=1) for booting the system from the hidden partition at the time of startup is set in a register and a return to the boot manager is made ((10) in FIG. 3). If this flag is not set ((11) in FIG. 3), the program for restoring the HDD 30 to the state at the time of shipment operates as described below.

Then, the boot manager program boots the OS (e.g., DOS) in the hidden partition in the HDD 30 ((12) in FIG. 3) to start a copying program (HDD2HDD Appl) (26).

The copying program performs dead copying of data in the HDD 30 to the backup HDD 40. At this time, the data in the HDD 30 is fixed in the state immediately before the transition to the hibernation state in the PC 10.

As a method of transferring the data from the HDD 30 to the backup HDD 40 for dead copying of the data, a method of performing DMA transfer of the data with respect to each sector in the HDD 30 or a method of performing image copying at the level of files stored in the HDD 30 may be adopted. If the method of performing image copying at the file level is adopted, an image may be processed by being compressed.

After the completion of dead copying, the BIOS checks whether the CMOS 27 has the setting indicating that a dead copying request has been made ((13) in FIG. 3). Since in this case the flag (DCR: 1 (Requested)) indicating that a dead copying request has been made is set, the BIOS resets the flag (DCR: 0 (Not Requested)), sets a flag (DCC: 1 (Completed)) indicating the completion of dead copying and thereafter resets the power supply for the system of the PC 10 ((14) in FIG. 3).

After the power supply for the system of the PC 10 has been reset, the PC 10 enters the same state as that in which the PC 10 is set when the power supply for PC 10 is ordinarily turned on, or that in which the PC 10 is set when restarted, the OS is started from the system partition, and the PC 10 returns to the state before transition to the hibernation state, i.e., the state in the environment under the ordinary OS ((15) to (17) in FIG. 3).

Thereafter, the hot key applet requests, by the timer, the BIOS to check whether the flag indicating that a dead copying request has been made is set in the CMOS 27 ((18) in FIG. 3). Since in this case the flag indicating that a dead copying request has been made is not set (DCR: 0 (Not Requested)) but the flag (DCC: 1 (Completed)) indicating the completion of dead copying is set ((19) and (20) in FIG. 3), an indication of the completion of dead copying is output on the LCD 13 and the flag indicating the completion of dead copying is reset in the CMOS 27 (DCC: 1 (Not Completed)).

As long as no request for dead copying is made by the user, the flag indicating that a dead copying request has been made is not set (DCR: 0 (Not Requested)) and the flag indicating the completion of dead copying is not set (DCC: 1 (Not Completed)). Accordingly, the hot key applet only repeats checking the CMOS 27 at predetermined time intervals by the timer ((21) and (22) in FIG. 3).

If a request for transition to the hibernation state is made by a user operation or by control in an energy saving function when the PC 10 is in the power-on state and in the environment under the ordinary OS ((23) in FIG. 3), the SMI handler checks whether the flag indicating that a dead copying request has been made is set in the CMOS 27 ((24) in FIG. 3). Since in this case the flag indicating that a dead copying request has been made is not set (DCR: 0 (Not Requested)), the SMI handler sets the chip set 15 so as to avoid making a SMI interrupt and makes a request for soft off. The chip set 15 receiving this request turns off the system of the PC 10 in a soft off manner and makes a transition to the hibernation state ((25) in FIG. 3).

If a request for processing for restoring the HDD 30 to the state at the time of shipment is made by a predetermined operation performed by the user when the POST is executed at the time of startup of the PC 10, the OS (DOS) stored in the hidden partition is started by the boot manager program stored in the HDD 30 ((26) in FIG. 3) to make the above-mentioned copying program run temporarily. At the stage where a check is made as to whether the flag indicating that a dead copying request has been made is set in the CMOS 27 ((27) in FIG. 3), however, the flag indicating that a dead copying request has been made is not set (DCR: 0 (Not Requested)) ((28) in FIG. 3). In this case, therefore, the program (D2D Appl) for executing processing for restoring the HDD 30 to the state at the time of shipment is started.

Thus, when the PC 10 is in the power-on state and in the environment under the ordinary OS, the user performs the predetermined operation to make a transition to the hibernation state immediately before shutting off of the power supply on the PC 10 side and to fix data in the HDD 30. In this state, the OS in the hidden partition is started to perform dead copying of the data from the HDD 30 to the backup HDD 40. After the completion of dead copying, the power supply for the system is reset to restore the PC 10 from the hibernation state to the original state.

Execution by Timer

The above-described dead copying processing can be performed periodically or automatically at preset times by the RTC 28 without the predetermined user operation.

To enable the processing to be performed in this manner, the user designates a time or date for dead copying by using a utility and sets the request for dead copying by startup of the timer.

Figure 5:
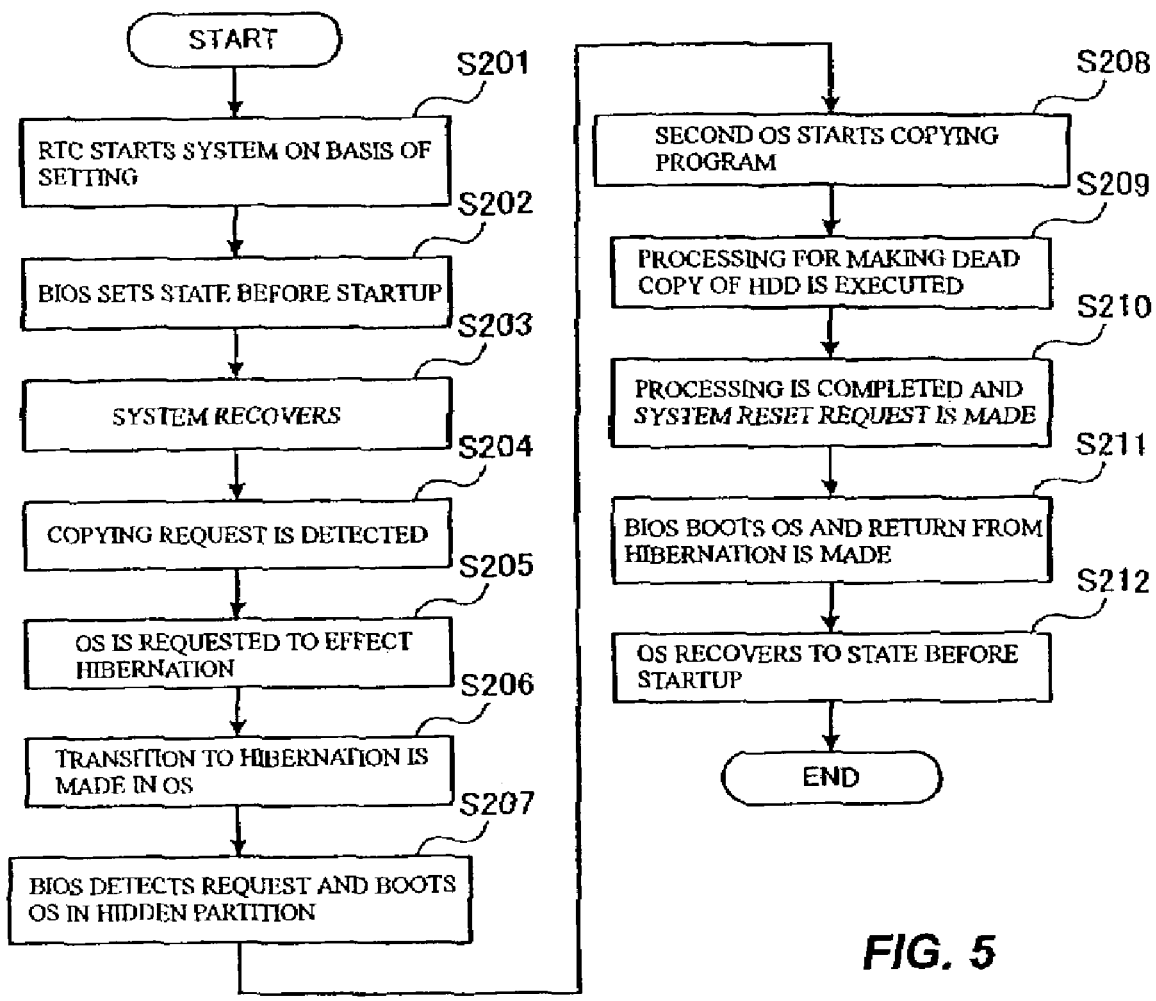
FIG. 5 is a diagram for outlining processing for making a dead copy of an HDD under the command of RTC.

Then, in the PC 10, dead copying processing is started by the RTC 28 at the set time or date, as shown in FIG. 5. If at this time the PC 10 is in the power-on state, the processing can be immediately started. However, if the PC 10 is in the sleep state (S3) or the hibernation state (S4), dead copying is started after starting the system (step S201). At this time, the PC 10 memorizes (sets) the state before the start of dead copying, i.e., one of the power-on state, the sleep state and the hibernation state (step S202).

The system (ordinary OS) recovers (step S203). If a dead copying request is detected (step S204), the power supply in the PC 10 is set in the hibernation state as described above (steps S205 and S206).

When the BIOS of the PC 10 detects the dead copying request, it boots the OS in the hidden partition of the HDD 30 (step S207) and thereafter starts a program for performing dead copying of the HDD 30 (hereinafter referred to as "copying program") (step S208) to execute processing for dead copying of the HDD 30 (step S209).

When processing for dead copying from the HDD 30 to the backup HDD 40 by the copying program is completed, the system of the PC 10 is reset to restore from the hibernation state to the original state by booting the ordinary OS (Windows or the like) (steps S210 and S211). At this time, the stored state before the start of dead copying processing is restored (step S212).

Figure 6:
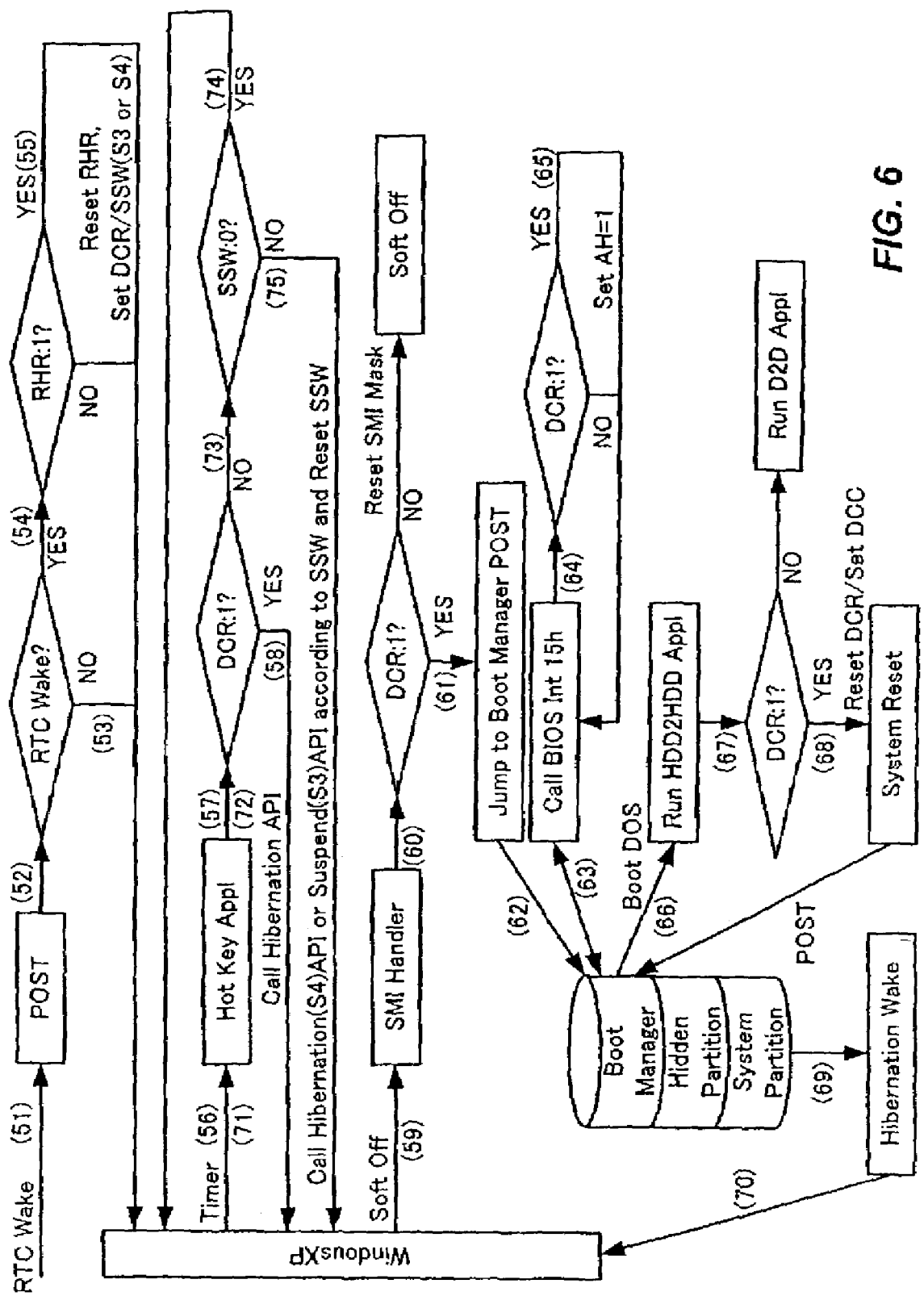
FIG. 6 is a diagram for explaining the flow of processing for making a dead copy of an HDD under the command of RTC.

FIG. 6 is a diagram for a further detailed description of the above-described sequence of processing steps.

The user designates a time or date at which dead copying of data in the HDD 30 should be started, a dead copying destination (e.g., the backup HDD 40 attached to the bay 18 in this embodiment), etc., by using a utility, and makes the setting effective. That is, the user makes a setting for starting dead copying processing at the set time.

The utility then sets the time or date in the RTC 28 by means of a kernel driver or the like and sets in the CMOS 27 a flag (RHR: 1 (Requested)) indicating that a dead copying request has been made under the control of the RTC 28.

At the time or date set in the RTC 28, the system of the PC 10 is started under a command from the RTC 28 to execute the POST ((51) in FIG. 6).

When the POST is executed, the BIOS checks whether the system has been awoken by the timer of the RTC 28 ((52) in FIG. 6). If the system has not been started by the timer of the RTC 28, the BIOS continues processing as ordinary startup ((53) in FIG. 6). If the system has been awoken by the timer of the RTC 28, the BIOS checks whether the flag (RHR: 1 (Requested)) indicating that a dead copying request has been made under the control of the RTC 28 is set in the CMOS 27 ((54) in FIG. 6). If it is determined that the flag (RHR: 1 (Requested)) indicating that a dead copying request has been made under the control of the RTC 28 is set, the BIOS resets in the CMOS 27 the flag (RHR: 1 (Requested)) indicating that a dead copying request has been made under the control of the RTC 28, and sets a flag (DCR: 1 (Requested)) indicating that a dead copying request has been made ((55) in FIG. 6).

Further, if the state of the PC 10 before the system is awoken is the suspended state (S3) or the hibernation state (S4), the BIOS sets in the CMOS 27 a flag corresponding to the state (SSW: 1 (S3) or 2(S4)). If the state of the PC 10 before the system is awoken is the power-on state other than the suspended or the hibernation state, the flag in the CMOS 27 is zero (SSW: 0 (Not Saved)) corresponding to the power-on state. Thus, the state before the system is awoken is stored in the CMOS 27.

Thereafter, the hot key applet periodically monitors information in the CMOS 27 on the basis of the timer ((56) in FIG. 6) to check whether the flag (DCR: 1 (Requested)) indicating that a dead copying request has been made is set in the CMOS 27 ((57) in FIG. 6). The hot key applet detects the flag (DCR: 1 (Requested)) indicating that a dead copying request has been made, and requests the OS through the API (application program interface) to make a transition to the hibernation state ((58) in FIG. 6).

The OS receiving this request makes a transition to the hibernation state in the PC 10.

After the transition to the hibernation state in the PC 10, the data in the HDD 30 is fixed. After the transition to the hibernation state in the PC 10, the OS makes a request for soft off (Soft Off) ((59) in FIG. 6).

Then, the chip set 15 hands over processing to the BIOS, and the SMI handler in the BIOS thereby starts checking whether the flag (DCR: 1 (Requested)) indicating that a dead copying request has been made is set in the CMOS 27 ((60) in FIG. 6). If it is thereby determined that the flag (DCR: 1 (Requested)) indicating that a dead copying request has been made is set, a jump is made to the POST in the BIOS to start the boot manager program stored in the HDD 30 ((61) and (62) in FIG. 6).

The boot manager program is then started by the POST to call the BIOS ((63) in FIG. 6). The BIOS checks whether the flag (DCR: 1 (Requested)) indicating that a dead copying request has been made is set in the CMOS 27 ((64) in FIG. 6). If it is thereby determined that the flag (DCR: 1 (Requested)) indicating that a dead copying request has been made is set, the flag (AH=1) for booting the OS from the hidden partition at the time of startup is set in the register and a return to the boot manager is made ((65) in FIG. 6).

Then, the boot manager program boots the OS (e.g., DOS) in the hidden partition in the HDD 30 to start the copying program ((66) in FIG. 6).

The copying program performs dead copying of data in the HDD 30 to the backup HDD 40. At this time, the data in the HDD 30 is fixed in the state immediately before the transition to the hibernation state in the PC 10.

After the completion of dead copying, the BIOS checks whether flag (DCR: 1 (Requested)) indicating that a dead copying request has been made is set in the CMOS 27 ((67) in FIG. 6). Since in this case the flag indicating that a dead copying request has been made is set, the BIOS resets the flag (DCR: 0 (Not Requested)), sets the flag (DCC: 1 (Completed)) indicating the completion of dead copying and thereafter resets the power supply for the system of the PC 10 ((68) in FIG. 6).

Then, the system of the PC 10 restores from the hibernation state to the original state and returns to the environment under the ordinary OS ((69) and (70) in FIG. 6).

Thereafter, the hot key applet requests, by the timer, the BIOS to check whether the flag indicating that a dead copying request has been made is set in the CMOS 27 ((71) and (72) in FIG. 6). Since in this case the flag indicating that a dead copying request has been made is not set (DCR: 0 (Not Requested)), a check is subsequently made as to whether the flag (SSW: 1(S3) or 2(S4)) indicating that the state of the PC 10 before the system is awoken is the suspended state or the hibernation state is set in the CMOS 27 ((73) in FIG. 6).

If the flag indicating the suspended state or the hibernation state is not set (SSW: 0 (Not Saved)), the state of the PC 10 before the system is awoken is the power-on state and processing is therefore returned to the OS to set the PC 10 in the ordinary operating state ((74) in FIG. 6). If the flag (SSW: 1(S3) or 2(S4)) indicating the suspended state or the hibernation state is set, the OS is requested through the API to make a transition of the system of the PC 10 into the suspended state or the hibernation state according to the flag, and the flag (SSW: 1(S3) or 2(S4)) indicating suspended state or the hibernation state is reset ((75) in FIG. 6).

The OS receiving this request makes the PC 10 resume operation in the suspended state or the hibernation state corresponding to the state before the system is awoken.

Thus, the time or date at which dead copying processing should be executed, etc., are set in the RTC 28 to enable the PC 10 to be started under the command from the RTC 28. On the PC 10 side, a transition to the hibernation state is made and data in the HDD 30 is fixed. In this state, the OS in the hidden partition is started and dead copying of the data in the HDD 30 to the backup HD 40 is performed. Further, after the completion of dead copying, the system is reset to recover the PC 10 to the state before the system is awoken.

While the description has been made by assuming that the destination for a dead copy of data in the HDD 30 is the backup HDD 40 attached to the bay 18, the dead copy destination is not limited to the backup HDD 40 attached to the bay 18. Dead copying to the backup HDD 60 attached to the docking bay 53 or to the database 80 provided in the external server 81 accessible via the network 70 can also be performed. In such a case, the backup HDD 60 attached to the docking bay 53 or to the database 80 provided in the external server 81 may be selected as a dead copy destination.

In a case where the database 80 in the external server 81 is selected, an IP address of the server 81, the storage place (database 80), etc., may be set on a utility of the PC 10 to enable data to be dispatched from the EthernetÃ□ chip 20.

Dead copying of the HDD 30 to the backup HDD 40 or 60, the database 80 in the external server 81 or the like can be performed as described above. If a fault or the like occurs in the HDD 30 after dead copying, the HDD 30 may be replaced with the backup HDD 40 or 60, the boot drive may changed from the HDD 30 to the backup HDD 40 or 60, or other suitable operations may be performed to restore the data to the state at the point in time when the dead copy is made.

Also, the HDD 30 may be replaced with a new one. A dead copy from the backup HDD 40 or 60 or the database 80 in the external server 81 to the new HDD 30 is then made to restore the data at the time of dead copying.

After a dead copy of the HDD 30 to the backup HDD 40 or 60 or the database 80 in the external server 81 has been made one time in the above-described manner, other dead copies may also be made by suitable timing. However, the second and other subsequent copies may be obtained by copying differential data from the first copy. If copying is performed in this manner, each of the second and other subsequent data backup operations can be executed in a shorter time.

In the above-described arrangement, a transition to the hibernation state in the PC 10 can be made by a user operating a particular key operation or the like to fix data in the HDD 30 and, in this state, the OS in the hidden partition can be started to perform dead copying of the data in the HDD 30 to the backup HDD 40.

As described above, a dead copy of the HDD 30 can be made by a one-touch operation and the user is not required to have a high degree of skill. Therefore, the process of replacing the HDD 30 with one having a larger capacity or a similar process as well as the ordinary backup process can be performed safely and easily.

Further, it is also possible to automatically execute dead copying processing at a set time or date by means of the RTC 28. It is therefore possible to efficiently make a dead copy during a time period when the PC 10 is not used, e.g., during the night.

Moreover, a dead copy of the HDD 30 may be saved to the database 80 in the external server 81 to ensure that if only a fault-free HDD is provided, the PC 10 can be used by taking the dead copy data from the database 80 in the external server 81 even if a fault occurs in the HDD 30, for example, in the field.

While an example of the arrangement in which a dead copy of the HDD 30 to the backup HDD 40 or 60 attached to the bay 18 or the docking bay 53 is made has been described, it is also possible to make a dead copy of the HDD 30 to any of other various types of storage device attached to the PC 10 through various interfaces.

Also, while the arrangement in which a dead copy of the HDD 30 to the database 80 in the external server 81 is made via the network 70 has been described, a data storage service offered by an internet service provider or any other company, for example, the Internet or the like used as the network 70 may be utilized for dead copying. Further, a dead copy of the HDD 30 may be stored in another user's own PC connected to the LAN or the like used as the network 70 or another PC or the like shared among persons in an organization to which the user belongs instead of being stored in the external server 81.

In the above-described embodiment, it is desirable that the backup HDDs 40 and 60 and the database 80 selected as a dead copy destination for data in the HDD 30 have at least a data capacity equal to or larger than that of the HDD 30.

If each of the backup HDDs 40 and 60 and the database 80 has a data capacity equal to or larger than that of the HDD 30, and if data is transferred by DMA transfer with respect to each sector in the HDD 30 to perform dead copying, area expansion can be achieved by partitioning the remaining area of the backup HDD 40 or 60 or the database 80. Also, if dead copying is performed at the level of files stored in the HDD 30, the remaining area may be included in some of partitioned areas when the partitions are made in the dead copy destination in correspondence with the partitions in the HDD 30.

In the above-described embodiment, to make a dead copy of the HDD 30, a transition to the hibernation state is made in the PC 10 by using a particular operating input as a trigger, and the OS (DOS or the like) in the hidden partition is started from the ordinary OS (Windows or the like). Also, similar processing may be performed to start an application for performing processing other than dead copying. For example, in a case where Linux is used as another OS, a switch from the environment under the ordinary OS (Windows) to an application on Linux can be made by a one-touch operation.

In the above-described embodiment, the program for making a transition to the hibernation state in the PC 10 and starting the OS (DOS or the like) in the hidden partition from the ordinary OS (Windows or the like) to make a dead copy of the HDD 30 or the program for simply making a transition to the hibernation state in the PC 10 and starting an application on the different OS (DOS or the like) from the ordinary OS (Windows or the like) may be provided in a storage medium in the following form. That is, the storage medium may be a CD-ROM, a DVD, a memory, a hard disk or the like on which the above-described program to be executed by the computer apparatus is stored so as to be readable by the computer apparatus.

The constituents of the arrangements described above in the description of the embodiment can be selectively used or can be changed into different arrangements without departing from the gist of the invention.

In the drawings and specifications there has been set forth a preferred embodiment of the invention and, although specific terms are used, the description thus given uses terminology in a generic and descriptive sense only and not for purposes of limitation. While the present invention has been described with respect to the embodiment of the invention, the technical scope of the present invention is not limited to the described embodiment. Various changes and modifications may be made in the described embodiment. As is apparent from the description in the appended Claims, modes of the present invention characterized by such changes and modifications are also included in the technical scope of the invention.

What is claimed is:

1. Apparatus comprising:
    a non-volatile data storage device capable of storing a first program and a second program for operating a computer apparatus and of storing data used when the computer apparatus is operated under the control of the first program;
    a working state storage processor for saving in said non-volatile data storage device the working state of the computer apparatus in response to receipt of a predetermined trigger input, said working state processor functioning to fix working state data stored in said non-volatile data storage device by suspending the first program and stopping power to said non-volatile data storage device and to said working state processor while supplying power to a bridge circuit and a controller when the predetermined trigger is inputted when said computer apparatus is operated under the control the first program;
    a system switch which restores power to the non-volatile storage device and said working state storage processor and boots the computer apparatus with the second program after fixation of the working state data; and a data dispatcher which dispatches the working state data stored in said non-volatile data storage device outside said non-volatile data storage device while the computer apparatus is operating under the control of the second program.

2. Apparatus according to claim 1, wherein said storage processor fixes, on the basis of the predetermined trigger input, the data stored in said non-volatile data storage device by storing the working state data at the point in time corresponding to the predetermined trigger input.

3. Apparatus according to claim 1, wherein said data dispatcher dispatches the data to a storage device detachably connected to the computer apparatus.

4. Apparatus according to claim 1, wherein said data dispatcher dispatches the data to an external data storage device via a network.

5. Apparatus according to claim 1, further comprising a timer which outputs a signal as the predetermined trigger input at a time set in advance.

6. Apparatus according to claim 1 wherein said predetermined trigger input directs a binary input/output system (BIOS) to set a dead copying request flag.

7. A method comprising the steps of:
fixing data in a data storage device when a predetermined trigger signal is input to a computer apparatus by saving a working state of the computer apparatus in said data storage device, suspending a first program, and stopping power to said data storage device and to a microprocessor unit (MPU) while supplying power to a bridge circuit and a controller;
restoring power to said data storage device and said MPU;
booting the computer apparatus with a second program;
making a dead copy of fixed data in the data storage device to another data storage device.

8. The method according to claim 7 wherein the step of fixing comprises compressing the data being fixed.

9. The method according to claim 8 wherein the step of making a dead copy comprises writing out the compressed fixed data.

10. The method according to claim 7 wherein said predetermined trigger signal directs a BIOS to set a dead copying request flag.

11. A program product comprising:
a computer storage medium having computer readable program code embodied therein for execution on a computer to make a dead copy of data, the computer readable program code in said program product being effective when executing to:
store an operating state of the computer in a hard drive at a point in time when an input of a predetermined trigger is received;
stop operation of a first basic system of the computer;
stop power to the hard drive and an MPU while supplying power to a bridge circuit and a controller;
restore power to the hard drive and the MPU;
boot the computer with a second basic system;
read out data stored in the hard disk drive and dispatch the data to an external data storage device; and
restart the operation of the first basic system after the dispatching of the data.

12. The program according to claim 11, wherein when a predetermined input is made at the time of booting of the computer, the computer is made to execute processing for restoring said hard disk drive to an initial state.

13. The program product according to claim 11 wherein said predetermined trigger input directs a BIOS to set a dead copying request flag.

14. A computer apparatus comprising:
a data storage part having a first area in which a first basic system is stored, and a second area in which a second basic system is stored; and
a program storage part in which is stored a program for making an MPU execute processing for stopping the operation of the first basic system on the basis of a predetermined trigger input, storing in said data storage part a working state in an environment under the first basic system, fixing said working state by stopping power to the data storage part and to said MPU while supplying power to a bridge circuit and a controller, starting the second basic system stored in the second area of said data storage part, restoring power to said data storage part and to said MPU, and dispatching the working state in said data storage part to an external place.

15. The computer apparatus according to claim 14, wherein the program stored in said program storage part makes the MPU execute processing for stopping the operation of the second basic system and restarting the operation of the first basic system after the completion of the predetermined processing, and for restoring the working state saved before stopping of the first basic system on the basis of the working state stored in said data storage part.

16. The computer apparatus according to claim 14, wherein the program stored in said program storage part makes said MPU execute processing for storing in said data storage part the working state in an environment under the first basic system by making a transition to a hibernation state in said computer apparatus.

17. The computer apparatus according to claim 14 wherein said predetermined trigger input directs a BIOS to set a dead copying request flag.

18. A method comprising the steps of:
operating a computer apparatus when a predetermined trigger is input to the computer apparatus operating in an environment under a first basic system;
storing in a data storage part a working state in the environment under the first basic system;
stopping the operation of the first basic system to fix said working state in said data storage part;
stopping power to said data storage part and to an MPU while supplying power to a bridge circuit and a controller;
restoring power to said data storage part and said MPU;
starting a second basic system; and
making a dead copy of said fixed working state in said data storage part to another data storage device.

19. The method according to claim 18, further comprising a step of compressing data representative of the working state.

20. The method according to claim 18 wherein said predetermined trigger directs a BIOS to set a dead copying request flag.

21. A program product comprising:
a computer storage medium having computer readable program code embodied therein for execution upon inputting of a predetermined trigger on a computer to make a dead copy of data, the computer readable program code in said program product being effective when executing to:
(a) store in a data storage part a working state in the environment under a first basic system;
(b) stop operation of the first basic system;
(c) stop power to said data storage part and to an MPU while supplying power to a bridge circuit and a controller;
(d) restore power to said data storage part and said MPU;
(e) start a second basic system;

(f) start an application operating on the second basic system when another predetermined trigger is input at a time of booting the computer wherein the application makes a dead copy of said working state in said data storage part to another data storage device; and
(g) stop the application operating on the second basic system.

22. The program product according to claim 21 wherein said predetermined trigger directs a BIOS to set a dead copying request flag.

* * * * *